United States Patent
Iyoshi et al.

(10) Patent No.: US 9,963,172 B2
(45) Date of Patent: May 8, 2018

(54) BODY STRUCTURE OF VEHICLE

(71) Applicant: MAZDA MOTOR CORPORATION, Hiroshima (JP)

(72) Inventors: Akira Iyoshi, Hiroshima (JP); Keizo Kawasaki, Hiroshima (JP); Takeshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days. days.

(21) Appl. No.: 15/513,481

(22) PCT Filed: Aug. 15, 2016

(86) PCT No.: PCT/JP2016/073835
§ 371 (c)(1),
(2) Date: Mar. 22, 2017

(87) PCT Pub. No.: WO2017/033787
PCT Pub. Date: Mar. 2, 2017

(65) Prior Publication Data
US 2017/0305469 A1    Oct. 26, 2017

(30) Foreign Application Priority Data
Aug. 24, 2015 (JP) .................... 2015-165123

(51) Int. Cl.
*B62D 25/02* (2006.01)
*B62D 25/04* (2006.01)

(52) U.S. Cl.
CPC .......... *B62D 25/025* (2013.01); *B62D 25/04* (2013.01)

(58) Field of Classification Search
CPC ............... B62D 25/025; B62D 25/04
(Continued)

(56) References Cited

U.S. PATENT DOCUMENTS 6,357,819 B1 * 3/2002 Yoshino .............. B29C 44/18
296/187.02
8,684,438 B2 * 4/2014 Stanik .................. B62D 25/02
296/146.15
(Continued)

FOREIGN PATENT DOCUMENTS

JP    2007-210367 A    8/2007
JP    2013-049375 A    3/2013
(Continued)

OTHER PUBLICATIONS

International Search Report issued in PCT/JP2016/073835; dated Oct. 4, 2016.

*Primary Examiner* — Joseph D. Pape
(74) *Attorney, Agent, or Firm* — Studebaker & Brackett PC

(57) ABSTRACT

A body structure of a vehicle includes a first panel and a second panel that form a closed cross-sectional portion, a partitioning panel that partitions the closed cross-sectional portion, and a reinforcement member disposed between the first panel and the partitioning panel, and includes a panel joining portion joined to the first panel, and a flange portion joined to the partitioning panel. A joining portion formed by the reinforcement member includes a rigid coupling portion in which the first panel and the panel joining portion are coupled to each other while being in contact with each other, and a flexible coupling portion in which the partitioning panel and the flange portion are coupled, with a damping member being provided therebetween. The partitioning panel includes an extended portion that extends from a vicinity of the flexible coupling portion toward the second panel and is joined to the second panel.

16 Claims, 13 Drawing Sheets

(58) Field of Classification Search
USPC .............................. 296/193.06, 209, 187.12
See application file for complete search history.

(56) References Cited

U.S. PATENT DOCUMENTS

| | | | |
|---|---|---|---|
| 2003/0184126 A1* | 10/2003 | Yamazaki | B62D 21/157 |
| | | | 296/209 |
| 2013/0049391 A1 | 2/2013 | Kurogi et al. | |
| 2013/0049405 A1 | 2/2013 | Kurogi et al. | |
| 2013/0049408 A1 | 2/2013 | Kurogi et al. | |
| 2015/0175218 A1* | 6/2015 | Yoshioka | B62D 25/025 |
| | | | 296/203.01 |

FOREIGN PATENT DOCUMENTS

| JP | 2013-049376 A | 3/2013 |
|---|---|---|
| JP | 2013-049378 A | 3/2013 |

\* cited by examiner

FIG.10
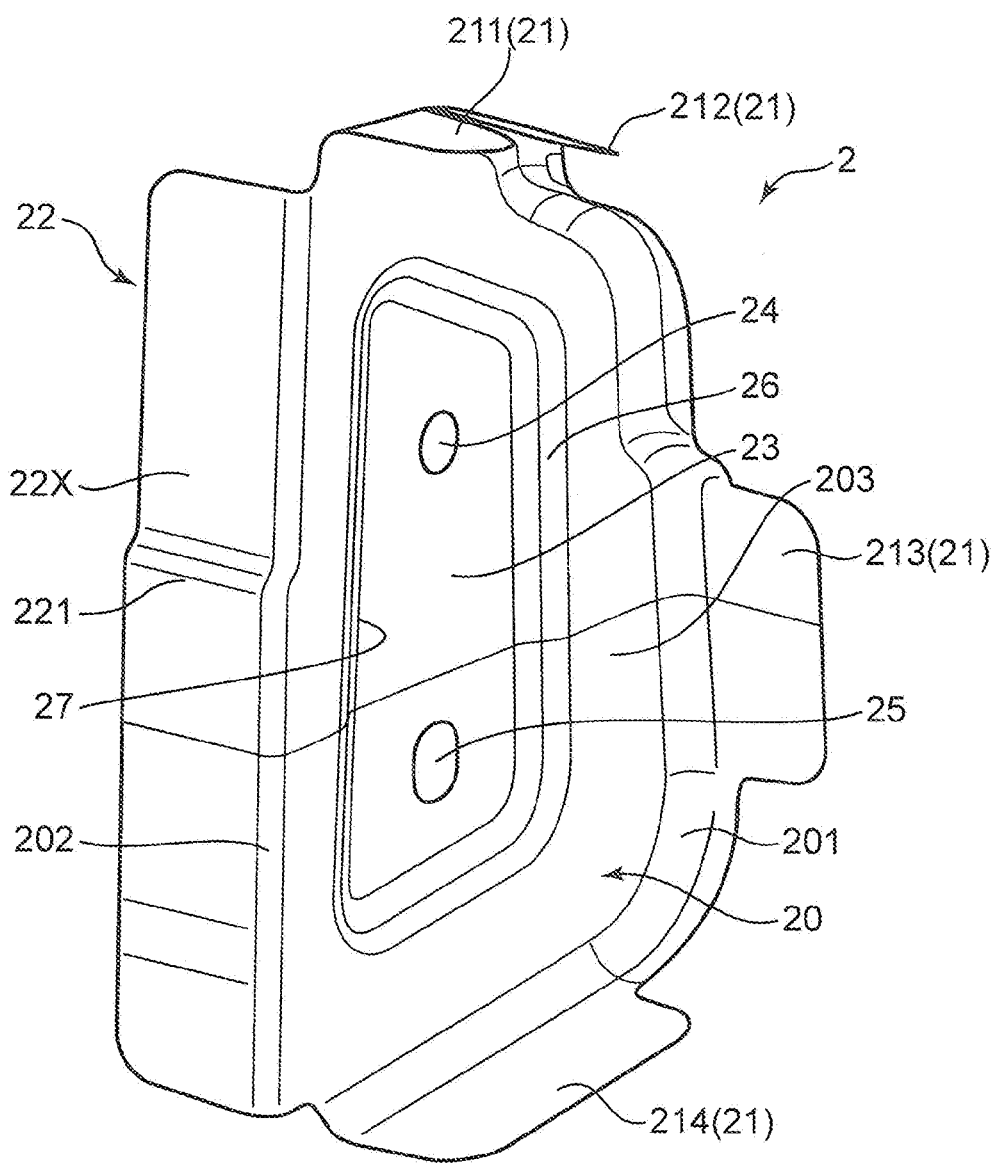
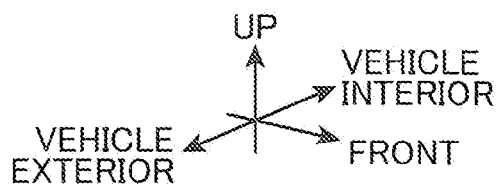

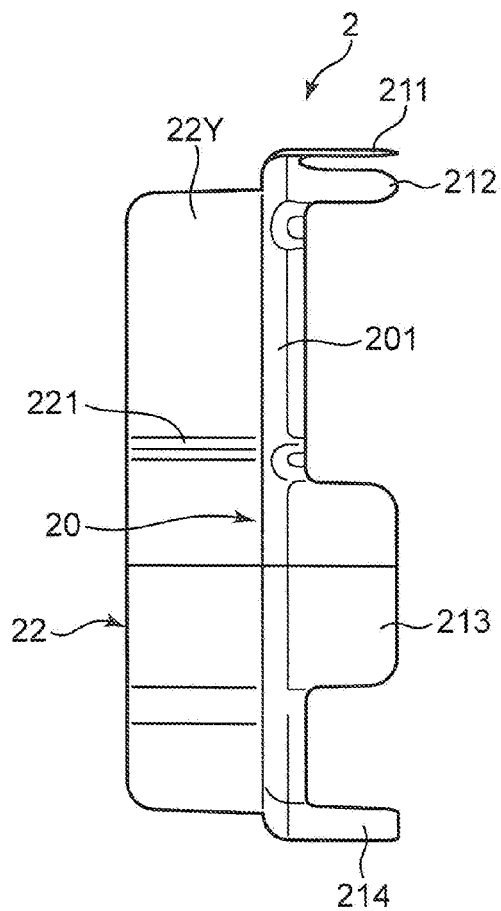
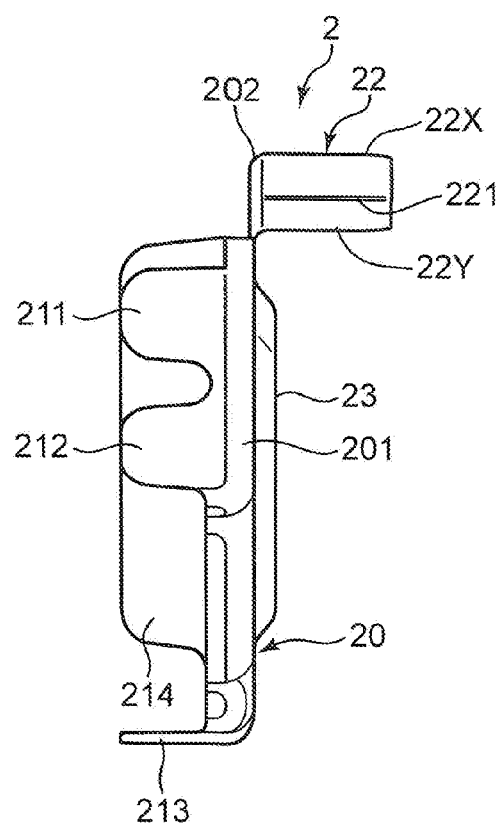
FIG.11A
FIG.11B

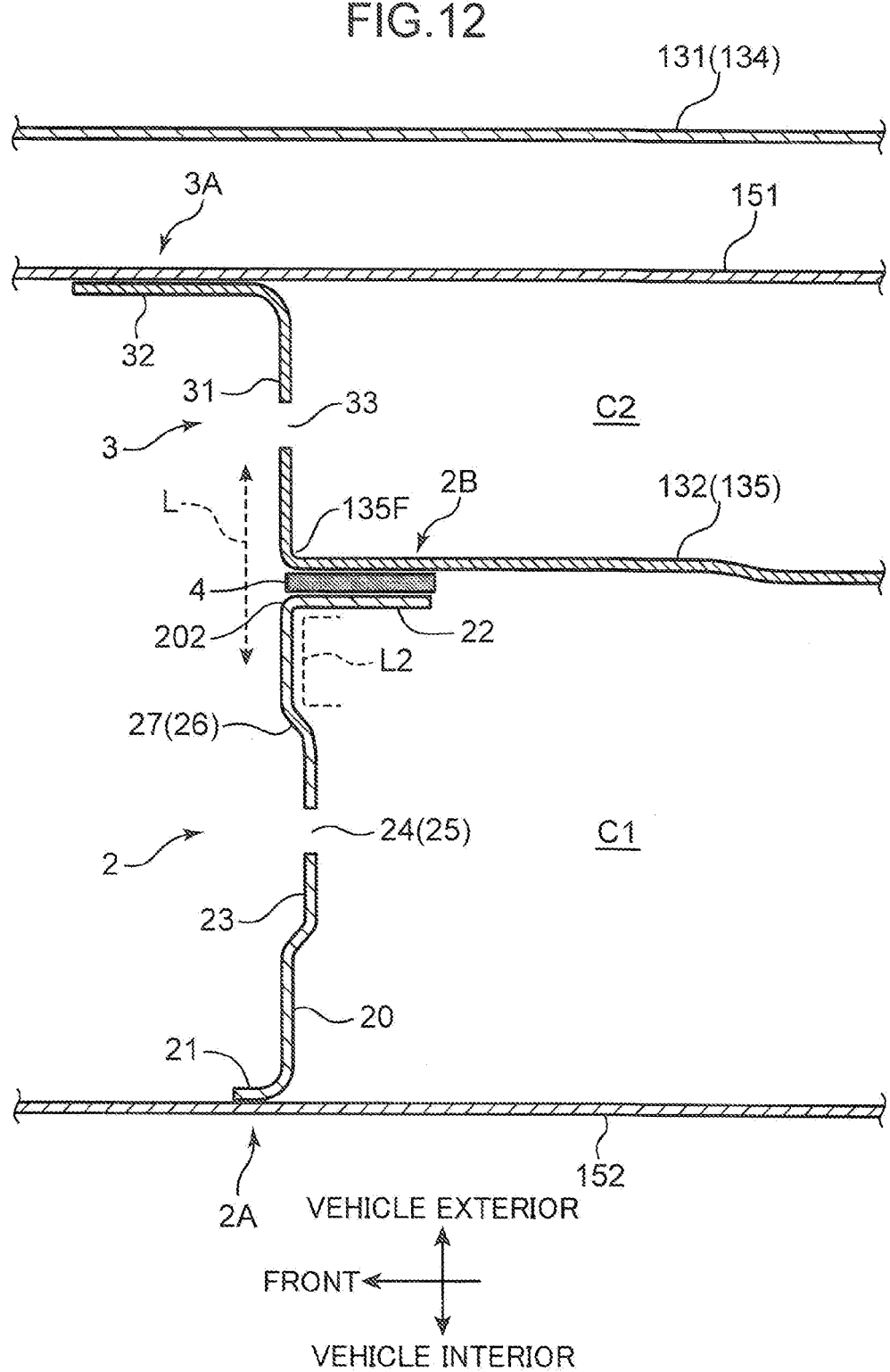

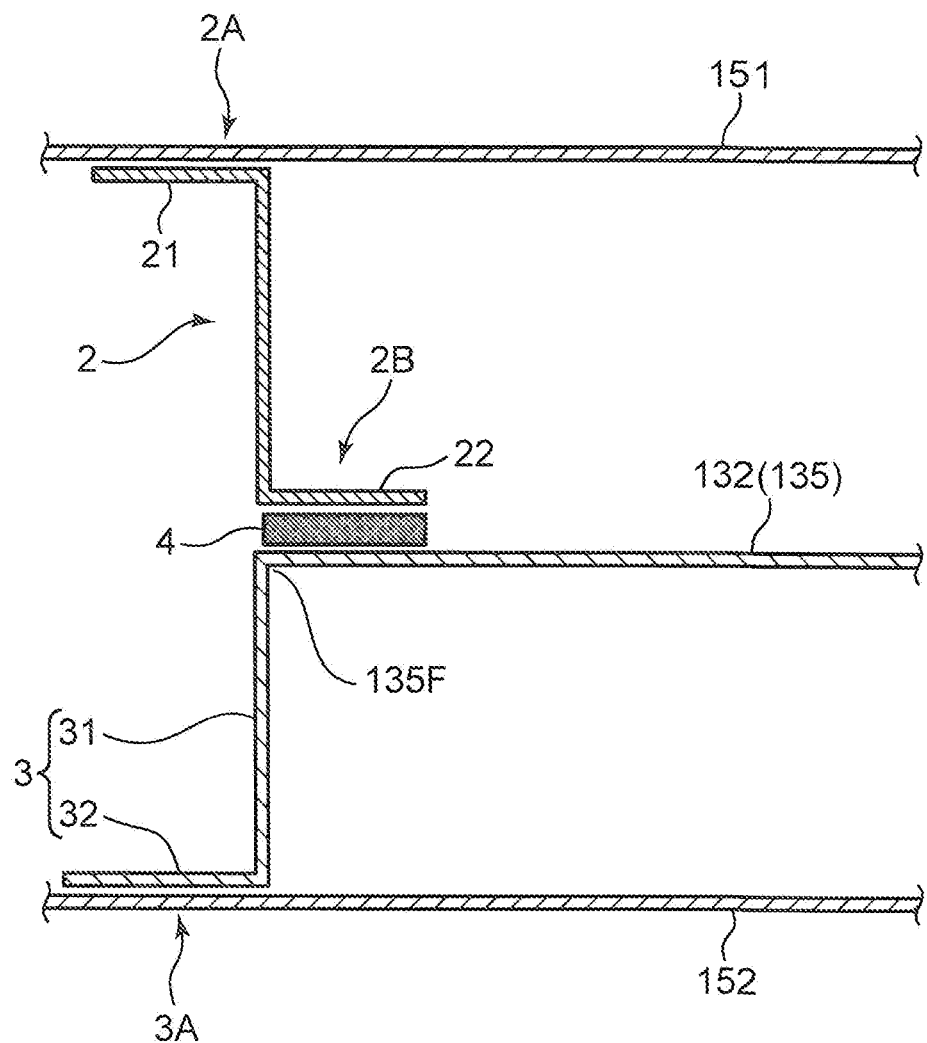

BODY STRUCTURE OF VEHICLE

TECHNICAL FIELD

The present invention relates to a body structure of a vehicle, and particularly relates to a vehicle-body structure in a portion including a panel forming a closed cross-sectional portion and a partitioning panel disposed in the closed cross-sectional portion.

BACKGROUND ART

Vehicles such as an automobile requires a vehicle structure with which transmission of vibrations, generated in various portions of the vehicle, into a vehicle cabin is suppressed as much as possible, to achieve a favorable riding comfort felt by a passenger. To satisfy the requirement, the present applicant has proposed techniques of achieving a sophisticated joining mode between a bulkhead (reinforcement member), disposed in a frame forming a closed section, and the frame in Patent Literature 1, 2, and 3. The joining mode features the frame provided with: a rigid coupling portion in which the frame and the bulkhead are coupled with each other while being in contact with each other; and a flexible coupling portion in which the frame and the bulkhead are coupled to each other with a damping member in between.

The vehicle includes a portion having a partitioned closed section structure, and including: two panels (frames) forming a closed section extending in a predetermined direction; and a partitioning panel that is disposed in the closed section and extends in the predetermined direction. Patent Literature 3 discloses a vehicle-body structure obtained with a bulkhead, including the rigid coupling portion and the flexible coupling portion, incorporated in the portion having the partitioned closed section structure described above.

For example, the partitioned closed section structure is employed in a coupling portion between a center pillar and a side sill, or the like. The coupling portion involves an especially high requirement for suppressing deformation and vibration of the closed section portion due to vibration of the vehicle.

CITATION LIST

Patent Literature

Patent Literature 1: Japanese Unexamined Patent Publication No. 2013-49375
Patent Literature 2: Japanese Unexamined Patent Publication No. 2013-49376
Patent Literature 3: Japanese Unexamined Patent Publication No. 2013-49378

SUMMARY OF INVENTION

As object of the present invention is to provide a body structure of vehicle with which in a vehicle-body portion having a partitioned closed section structure, a damping member can provide an effective vibration damping effect, with deformation of a closed cross-sectional portion prevented.

A body structure of a vehicle according to one aspect of the present invention includes a first panel and a second panel that form a closed cross-sectional portion extending in a predetermined direction, a partitioning panel that partitions the closed cross-sectional portion and extends in the predetermined direction, and a reinforcement member that is disposed between the first panel and the partitioning panel in the closed cross-sectional portion, and includes a panel joining portion joined to the first panel, and a flange portion joined to the partitioning panel. A joining portion formed by the reinforcement member includes a rigid coupling portion in which the first panel and the panel joining portion are coupled to each other while being in contact with each other, and a flexible coupling portion in which the partitioning panel and the flange portion are coupled to each other, with a damping member being provided therebetween. The partitioning panel includes an extended portion that extends from a vicinity of the flexible coupling portion toward the second panel and is joined to the second panel.

BRIEF DESCRIPTION OF DRAWINGS

FIG. 10 is a perspective view of a bulkhead disposed in a closed cross-sectional portion of the side sill.

FIG. 11A is a side view of the bulkhead, and FIG. 11B is an upper view of the bulkhead.

FIG. 12 is an enlarged view of a main part in FIG. 3, illustrating an arranged state of the bulkhead and an extended portion.

FIG. 13 is a cross-sectional view of a coupling portion between the side sill and the center pillar according to a modification, in the vehicle width direction.

DESCRIPTION OF EMBODIMENTS

An embodiment of the present invention is described in detail below with reference to the drawings.

[Overall Description of Vehicle-Body]

Figure 1:
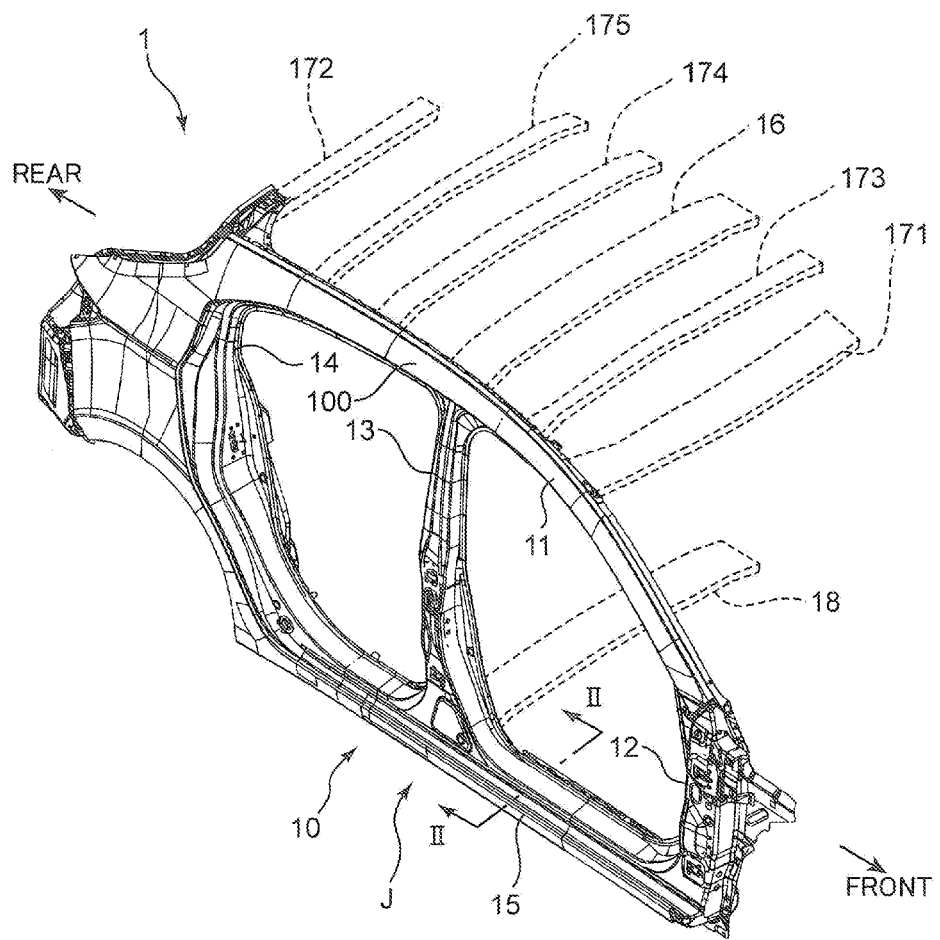
FIG. 1 is a perspective view illustrating a part of a body of a vehicle employing the present invention.

FIG. 1 is a perspective view illustrating a part of a vehicle-body 1 of a vehicle employing the present invention. The figure includes a "front" arrow indicating a front side, and a "rear" arrow indicating a rear side. The "front" and the "rear" arrows and the other like arrows in other figures are based on the front and rear of the vehicle illustrated in FIG. 1.

The vehicle-body 1 includes a side frame 10 forming each of left and right side surfaces of the vehicle. FIG. 1 illustrates the side frame 10 only on one side surface. The side frame 10 includes: a side frame outer 100 serving as an exterior of a side surface portion of the vehicle as well as a roof rail 11, a front pillar 12, a center pillar 13, a rear pillar 14, and a side sill 15 on a vehicle inner side of the side frame outer 100.

The side frame outer 100 is a plate member obtained by performing press molding in such a manner that a single steel plate is molded into a predetermined shape with front and rear door openings punched out. An outer surface of the side frame outer 100 serves as an exterior coated surface of the vehicle. The roof rail 11 in an upper portion of the vehicle and the side sill 15 on a lower side of the vehicle each extend in a front and rear direction of the vehicle. The front pillar 12, the rear pillar 14 and the center pillar 13, respectively on the front side, the rear side, and at a portion around the center in the front and rear direction, each couple the roof rail 11 and the side sill 15 to each other in an upper and lower direction.

The side sill 15, extending in the front and rear direction (predetermined direction), and the center pillar 13, extending in the upper and lower direction, form a coupling portion J in a mode in which a substantially T-shaped intersection is defined with a lower end portion of the center pillar 13 coupled to the intermediate portion of the side sill 15 in the front and rear direction. The present embodiment is an example in which the body structure of vehicle according to the present invention is applied to the coupling portion J.

A plurality of reinforcements (hereinafter, simply referred to as "reinforcer" in this specification) and headers, extending in a vehicle width direction, are provided between the roof rail 11 of the one side frame 10 and a roof rail (not illustrated) of the other side frame. In the present embodiment, a roof reinforcer 16 is provided at a disposed position of the center pillar 13, and three roof reinforcers 173, 174, and 175 are provided on front and rear sides thereof. A front header 171 and a rear header 172 are respectively provided at portions further on the forward side and the rear side of the vehicle. An unillustrated roof panel is attached between the pair of side frames 10 in such a manner as to cover the upper side of the roof reinforcers 173 to 175 and the headers 171 and 172. A plurality of cross members are provided between the one side sill 15 and the other side sill (not illustrated). In FIG. 1, only the cross member 18 provided at the coupling portion J is illustrated.

[Structure of Coupling Portion J]

Figure 2:
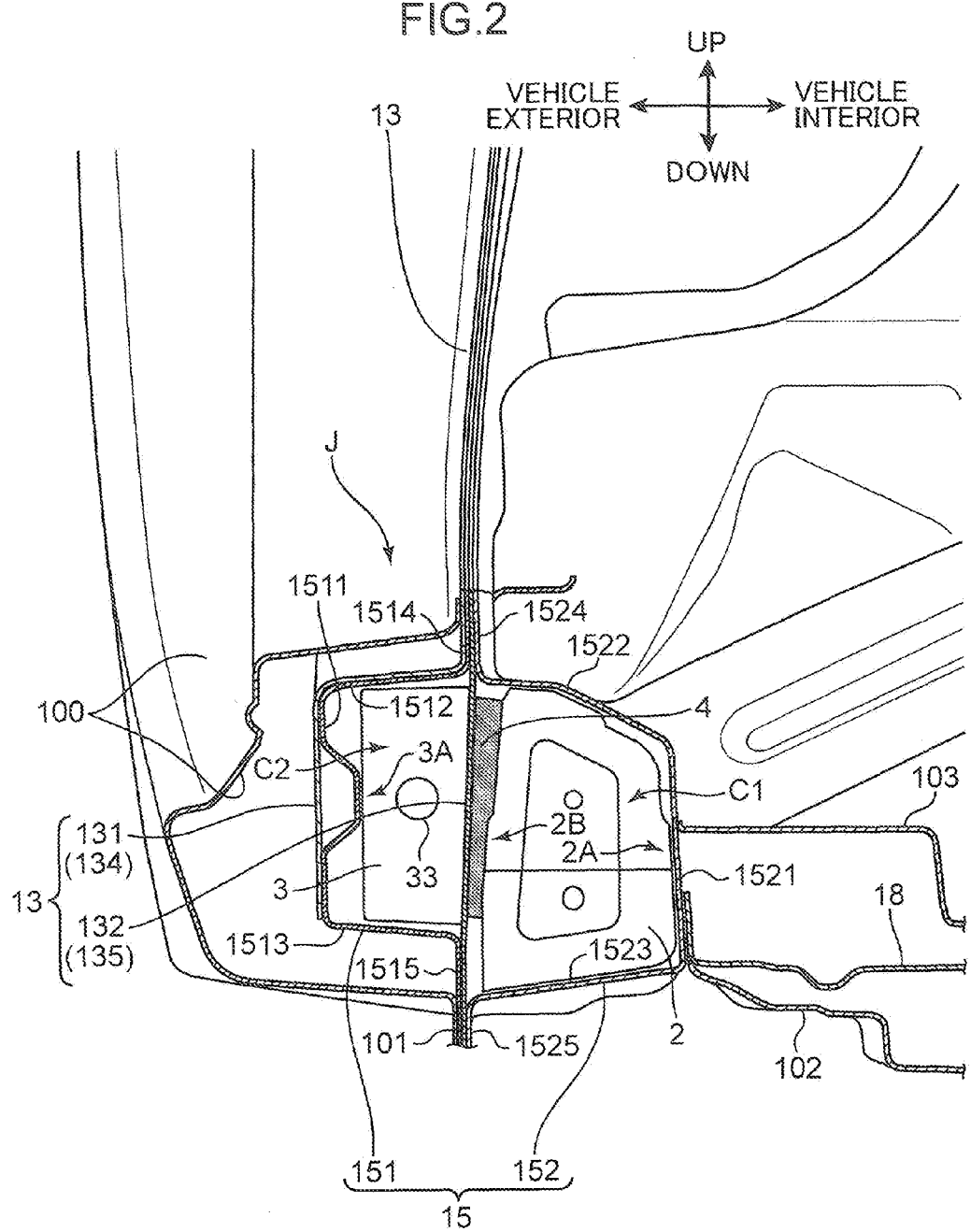
FIG. 2 is a schematic cross-sectional view taken along line II-II in FIG. 1.
Figure 3:
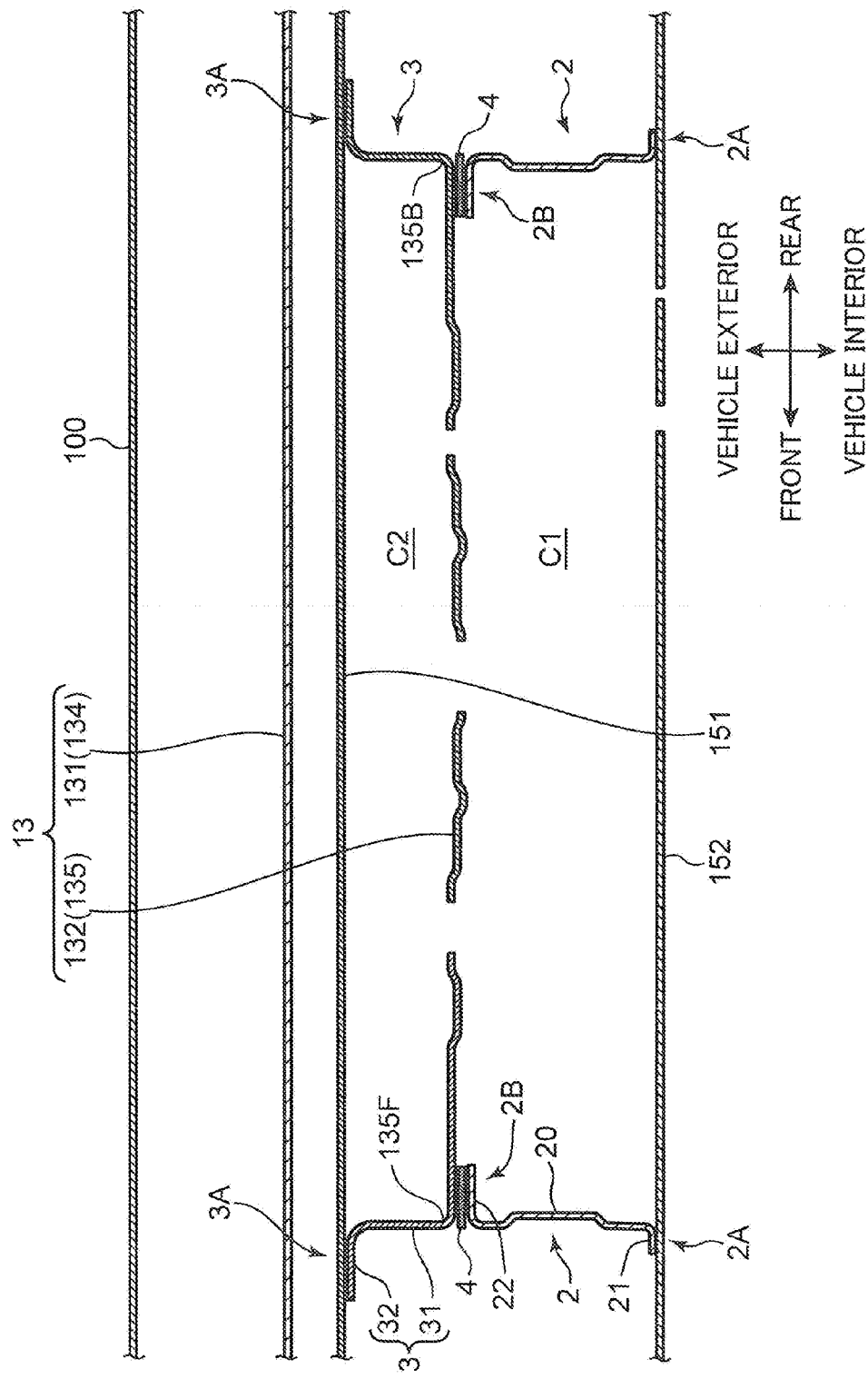
FIG. 3 is a cross-sectional view of a coupling portion between a side sill and a center pillar as viewed in a vehicle width direction.

FIG. 2 is a schematic cross-sectional view taken along line II-II in FIG. 1, and FIG. 3 is a cross-sectional view of the coupling portion J between the side sill 15 and the center pillar 13 as viewed in the vehicle width direction. The side frame outer 100 covers a vehicle outer side of the coupling portion J. A floor panel 102 covers a bottom portion on a vehicle inner side of the coupling portion J, that is, in a vehicle cabin. The cross member 18 and a sheet bracket 103, as a component thereof, are disposed on the floor panel 102. In a closed cross-sectional portion of the side sill 15 at the coupling portion J, a bulkhead 2 (reinforcing member) and an extended portion 3 integrated with a component of the center pillar 13 are disposed. Each component is described below.

The side sill 15 is a vehicle-body rigid member with the closed cross-sectional portion extending in the front and rear direction (predetermined direction) and includes: a side sill outer reinforcer 151 (second panel) having a substantially square U-shaped cross-sectional shape; and a side sill inner 152 (first panel) also having a substantially square-U shaped cross-sectional shape. The side sill outer reinforcer 151 includes: a first side plate 1511 substantially in parallel with an opening portion of the square-U-shape; and a first upper plate 1512 and a first lower plate 1513 extending in a vehicle inner side direction, respectively from upper and lower edges of the first side plate 1511. A first upper flange portion 1514 and a first lower flange portion 1515, with which other members are joined, are respectively provided to opening side end edges of the first upper plate 1512 and the first lower plate 1513.

The side sill inner 152 includes: a second side plate 1521 substantially in parallel with an opening portion of the square U-shape; and a second upper plate 1522 and a second lower plate 1523 respectively extending from an upper edge and a lower edge of the second side plate 1521 in a vehicle outer direction. A second upper flange portion 1524 and a second lower flange portion 1525, with which other members are joined, are respectively provided to opening side end edges of the second upper plate 1523 and the second lower plate 1522.

The center pillar 13 is a vehicle-body rigid member, having a closed cross-sectional extending in the upper and lower direction, and includes: a center pillar outer reinforcer 131 on a vehicle outer side; and a center pillar inner 132 on a vehicle inner side. The center pillar outer reinforcer 131 and the center pillar inner 132 each have end portions, in the front and rear direction, provided with flange portions for butt joining and are integrated with each other with the flange portions joined to each other by spot welding.

Figure 4:
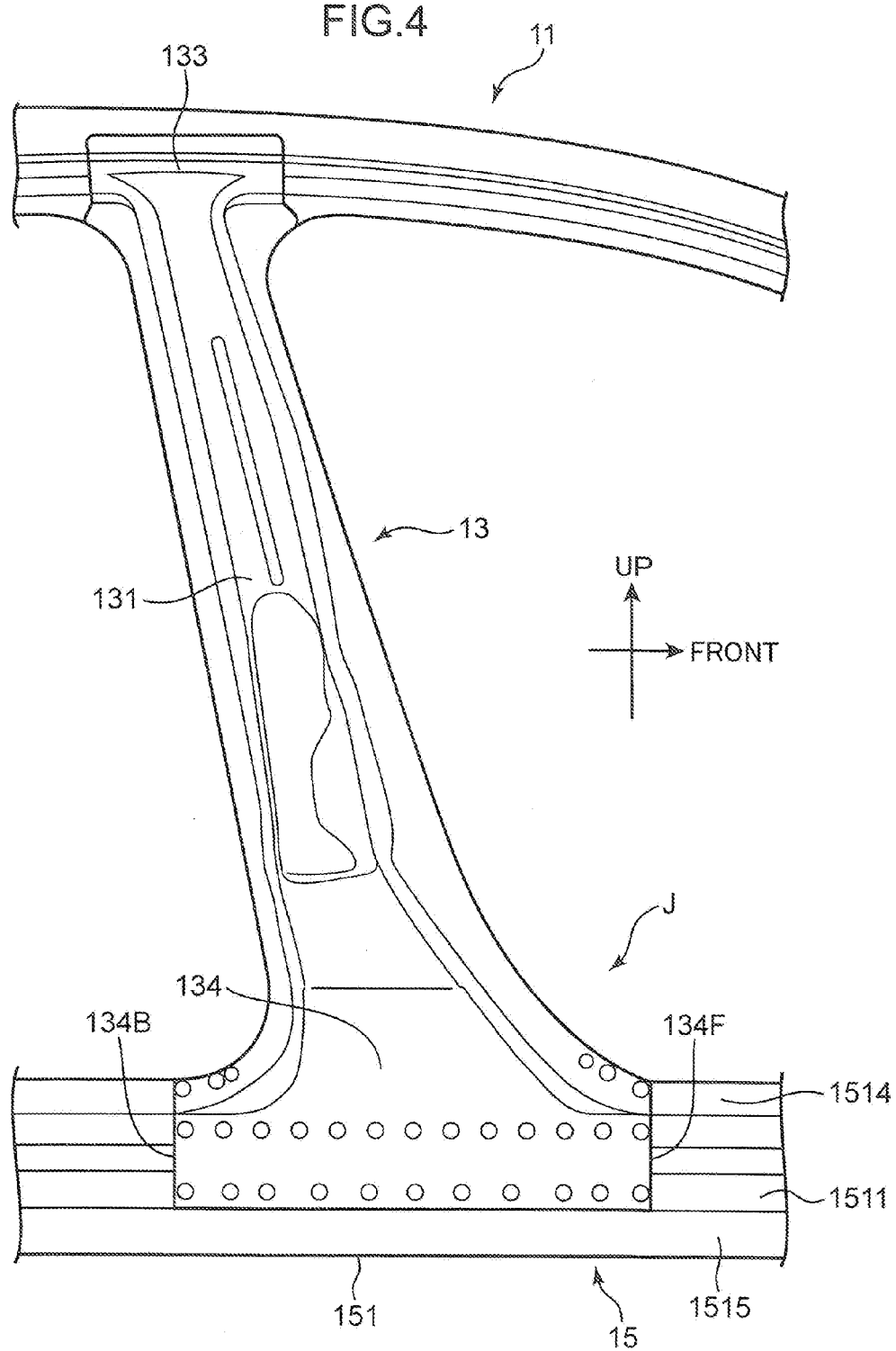
FIG. 4 is a side view of the coupling portion between the side sill and the center pillar of the vehicle-body as viewed from the vehicle outer side of the vehicle, and illustrates a state where a side frame outer is removed.
Figure 6:
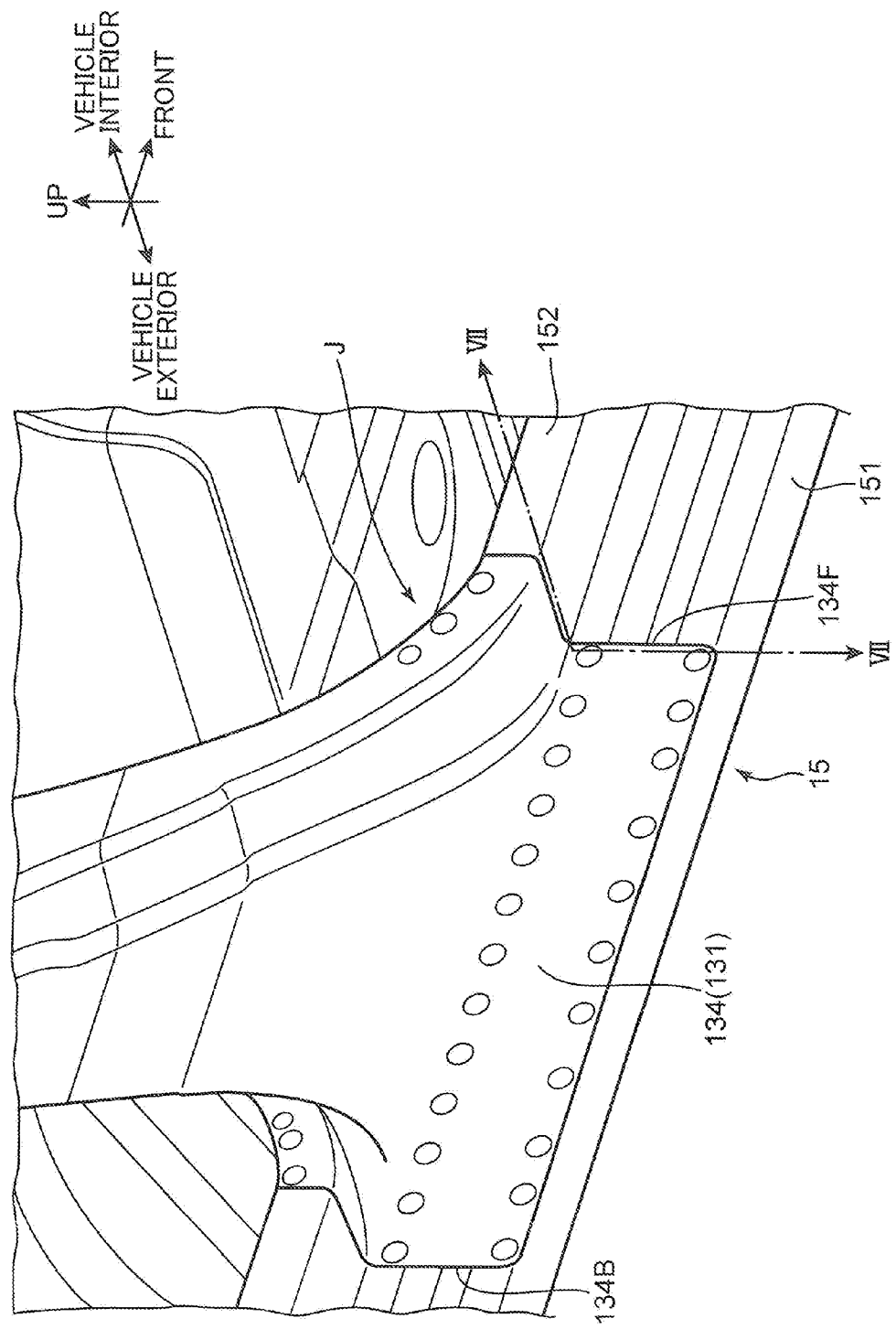
FIG. 6 is a perspective view of the coupling portion illustrated in FIG. 4.

FIG. 4 is a side view of the coupling portion J as viewed from the vehicle outer side of the vehicle, and illustrates a state where the side frame outer 100 is removed. FIG. 6 is an enlarged perspective view of the coupling portion J in the state that is the same as that in FIG. 4. The center pillar outer reinforcer 131 includes: an upper end portion 133 joined to the roof rail 11; and a lower end portion 134 joined to the side sill 15 (side sill outer reinforcer 151). The lower end portion 134 is a portion wider than a main body portion of the center pillar outer reinforcer 131 in the front and rear direction, and includes: a front end edge 134F and a rear end edge 134B respectively provided on a front end and a rear end of the wide portion. The lower end portion 134 is bent to have an L shape in a cross section as viewed in the vehicle width direction as illustrated in FIG. 2, and thus protrudes toward the vehicle outer direction. The lower end portion 134 has an inner surface in contact with an outer surface of the side sill outer reinforcer 151 and is fixed to the first side plate 1511 by spot welding.

Figure 5:
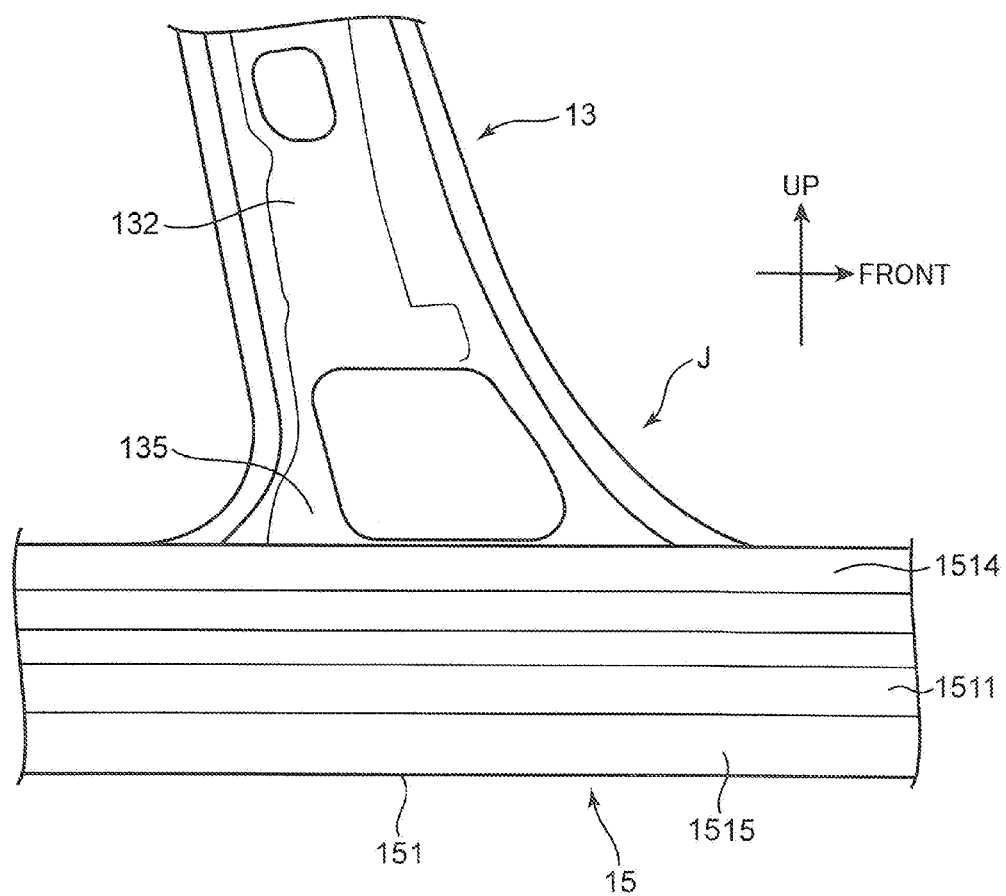
FIG. 5 is a side view illustrating a state where a center pillar outer reinforcer is removed from the state illustrated in FIG. 4.

FIG. 5 is a side view illustrating a state where the center pillar outer reinforcer 131 is removed from the state illustrated in FIG. 4. The center pillar inner 132 is a substantially flat plate-shaped member extending in the upper and lower direction, and has a lower end provided with a partitioning plate portion 135 (partitioning panel) provided to the closed cross-sectional portion of the side sill 15. As illustrated in FIG. 2, the partitioning plate portion 135 partitions the closed cross-sectional portion of the side sill 15 into a first closed cross-sectional portion C1 and a second closed cross-sectional portion C2. The first closed cross-sectional portion C1 is a space defined by the partitioning plate portion 135 and the side sill inner 152, and the second closed cross-sectional portion C2 is a space defined by the partitioning plate portion 135 and the side sill outer reinforcer 151.

The side sill outer reinforcer 151 and the side sill inner 152 are joined to each other with the partitioning plate portion 135 provided between their butting surface portions. More specifically, the first upper flange portion 1514 and the second upper flange portion 1524 are butted and fixed to each other by spot welding, with the upper end portion of the partitioning plate portion 135 provided in between. The first lower flange portion 1515 and the second lower flange portion 1525 are butted to each other with the lower end portion of the partitioning plate portion 135 provided in between, and are fixed together with the lower end portion 101 of the side frame outer 100 by spot welding.

Figure 8:
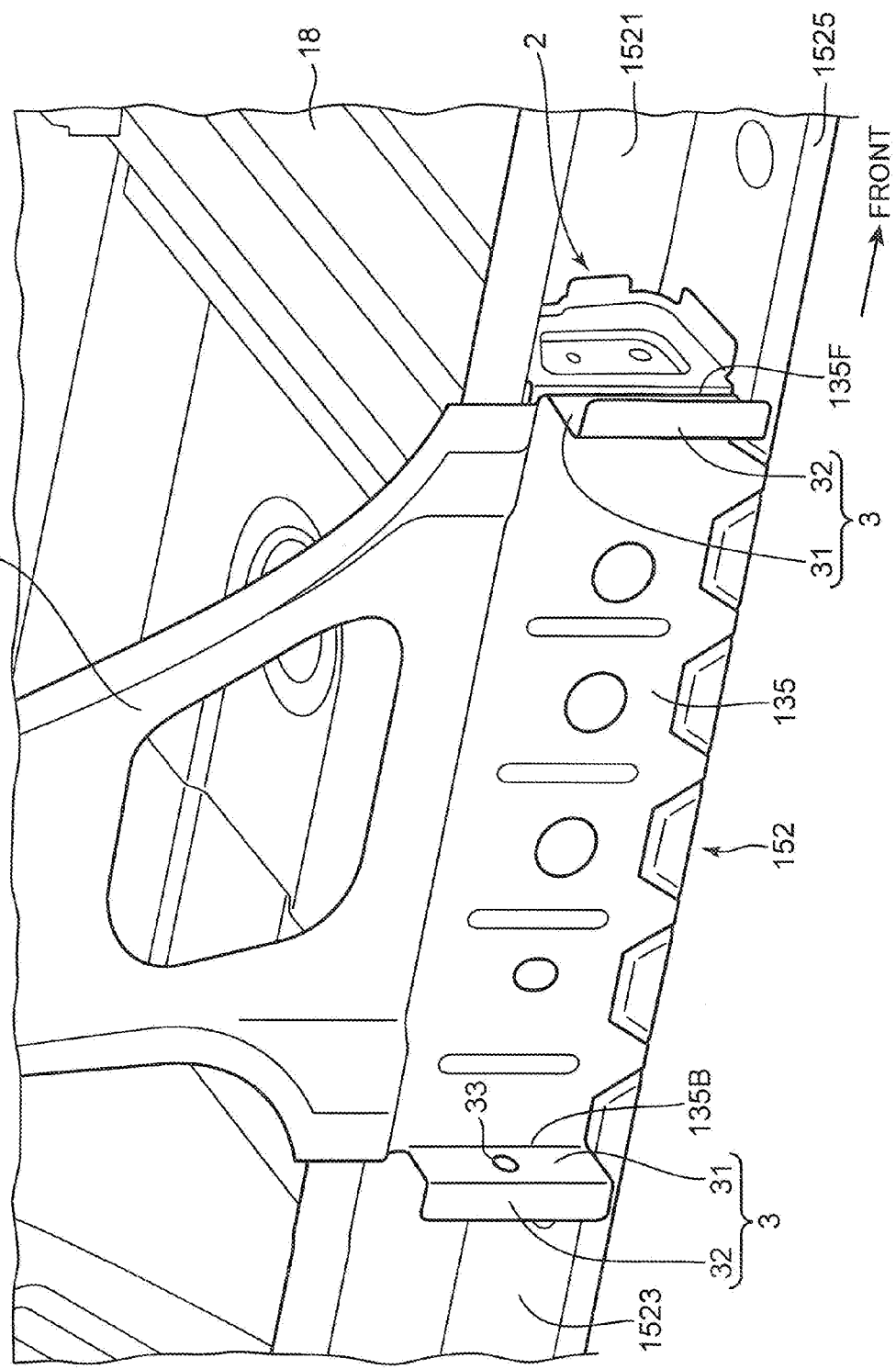
FIG. 8 is a perspective view illustrating a state where a side sill outer reinforcer is removed from the state illustrated in FIG. 5.

As illustrated in FIG. 8, the partitioning plate portion 135 is a portion wider than the main body portion of the center pillar inner 132 in the front and rear direction (predetermined direction), and includes a front end edge 135F and a rear end edge 135B respectively at a front end and a rear end of the wider portion. In a range between the front end edge 135F and the rear end edge 135B, the closed cross-sectional portion of the side sill 15 is divided into the two closed cross-sectional portions C1 and C2 extending in the front and rear direction. The extended portion 3, functioning as a reinforcement member for reinforcing the rigidity the side sill 15, extends from each of the front end edge 135F and the rear end edge 135B. The extended portion 3 is provided to each of the front and rear sides of the second closed cross-sectional portion C2.

Figure 7:
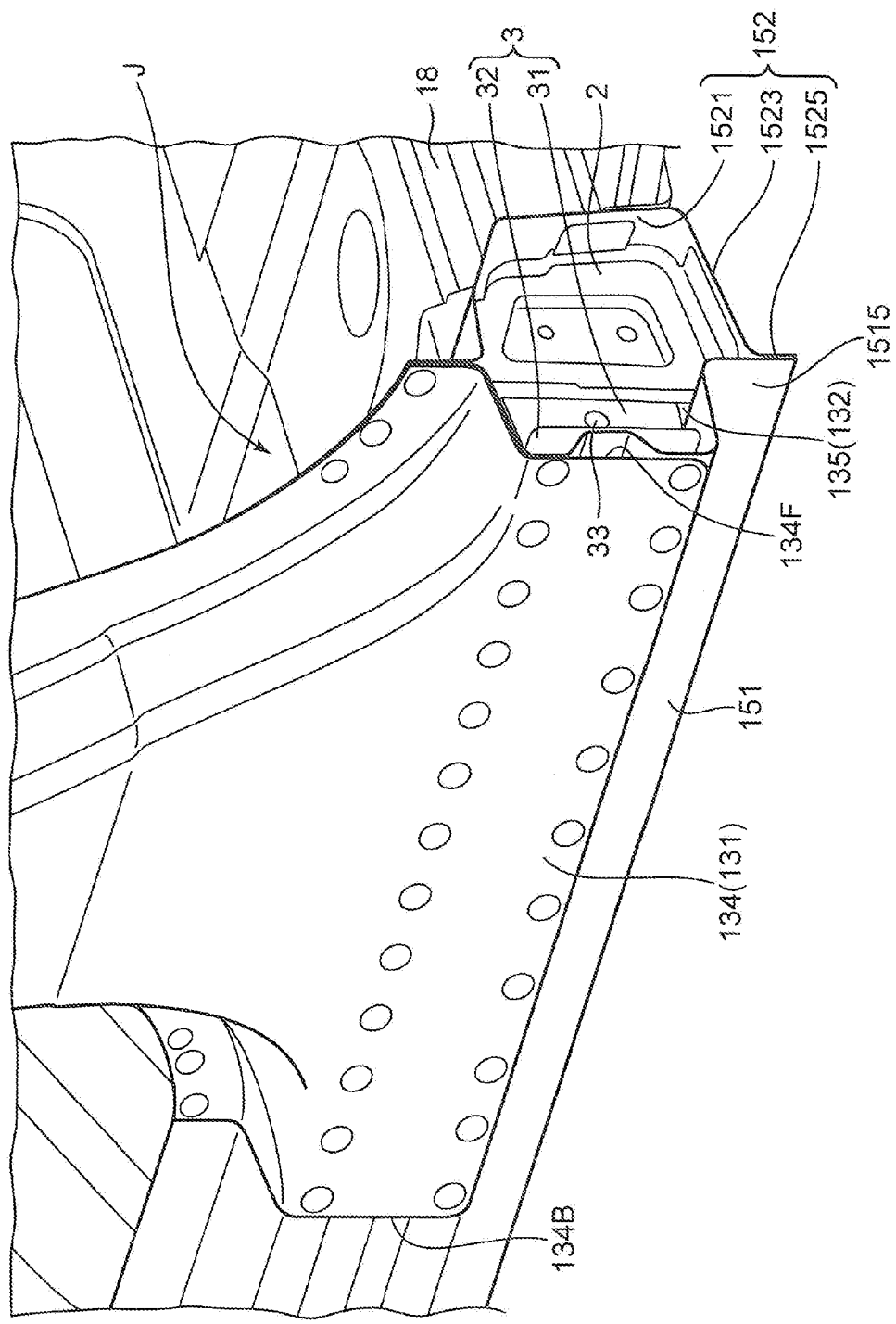
FIG. 7 is a cross-sectional view taken along line VII-VII in FIG. 6.
Figure 9:
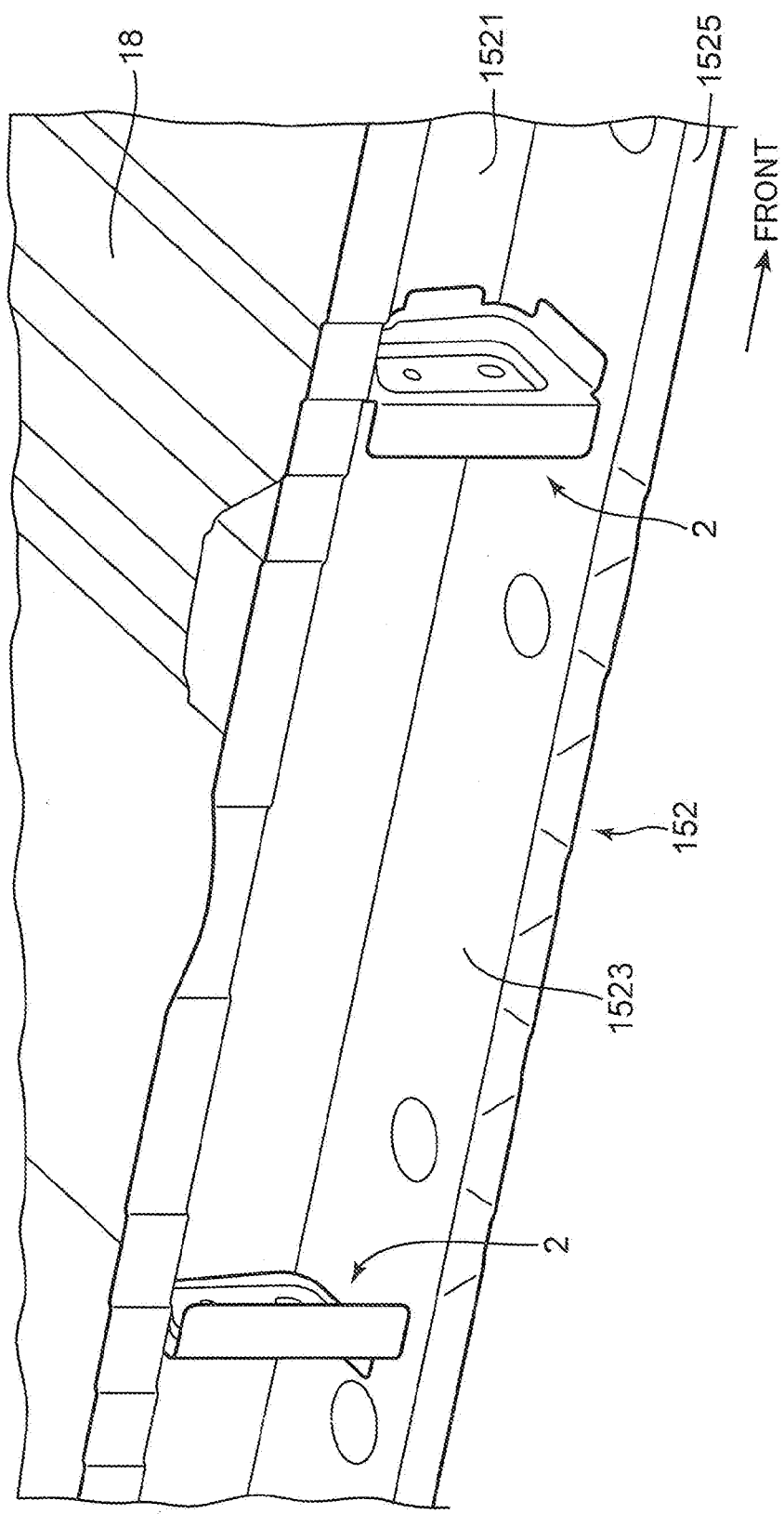
FIG. 9 is a perspective view illustrating a state where a center pillar inner is removed from the state illustrated in FIG. 8.

The bulkhead 2 is a reinforcement member that reinforces the rigidity of the side sill 15 around the coupling portion J. FIG. 7 is a cross-sectional view taken along line VII-VII in FIG. 6, FIG. 8 is a perspective view illustrating a state where the side sill outer reinforcer 151 is removed from the state illustrated in FIG. 5, and FIG. 9 is a perspective view illustrating a state where the center pillar inner 132 is removed from the state illustrated in FIG. 8. The bulkhead 2 is provided on each of the front and the rear sides of the first closed cross-sectional portion C1.

The bulkhead 2 on the front side is disposed near the front end edge 135F of the partitioning plate portion 135, and the bulkhead 2 on the rear side is disposed near the rear end edge 135B. Thus, the bulkheads 2, near the front end edge 135F and the rear end edge 135B, are disposed between the side sill inner 152 and the partitioning plate portion 135 and have joining portions for these members. The extended portions 3 are formed by bending extra length portions, extending from the front end edge 135F and the rear end edge 135B in the front and rear direction, toward the vehicle outer side, and have the joining portions for the side sill outer reinforcer 151.

The bulkhead 2 includes: a joining portion 21 (panel joining portion) joined to the side sill inner 152 (first panel); and a flange portion 22 joined to the partitioning plate portion 135 (partitioning panel). The extended portions 3 are portions integrated with the partitioning plate portion 135, and each include: an extended main body portion 31 extending from the front end edge 135F or the rear end edge 135B toward the vehicle outer side (side sill outer reinforcer 151); and an extended joining portion 32 formed at an end edge of the extended main body portion 31 and joined to the side sill outer reinforcer 151 (second panel).

The joining portion formed of the bulkhead 2 includes: a rigid coupling portion 2A where the side sill inner 152 and the joining portion 21 are coupled to each other while being in contact with each other; and a flexible coupling portion 2B in which the partitioning plate portion 135 and the flange portion 22 are coupled to each other with a damping member 4 provided in between. The extended joining portion 32 of the extended portion 3 forms a joining portion as a rigid coupling portion 3A.

[Detail Description on Bulkhead]

Next, the bulkhead 2 is described in detail. FIG. 10 is a perspective view of the bulkhead 2, FIG. 11A is a side view of the bulkhead 2, and FIG. 11B is an upper view thereof. The bulkhead, which is also referred to as a bamboo-joint member, and is a member formed by performing a punching and bending process and the other like processes on a plate material having an excellent rigidity such as a steel material.

The bulkhead 2 includes: a reinforcement main body portion 20 formed of a flat plate-shaped portion having a substantially trapezoidal shape; and the joining portion 21 and the flange portion 22 described above. The reinforcement main body portion 20 extends between the joining portion 21 and the flange portion 22. Here, four connection pieces, including a first connection piece 211, a second connection piece 212, a third connection piece 213, and a fourth connection piece 214, are provided as the joining portion 21. A first ridge portion 201 and a second ridge portion 202, formed by a bending process, are on an outer circumference edge of the reinforcement main body portion 20. The second ridge portion 202 is a linear ridge line along the lower base side of the reinforcement main body portion 20 having the trapezoidal shape, and the first ridge portion 201 is a square U-shaped ridge portion extending along sides other than the lower base side.

The first to the fourth connection pieces 211 to 214 are raised portions that are bent forward and continue from the first ridge portion 201, and each independently have a shape of a tongue piece. The pieces are bent by substantially 90° with respect to the reinforcement main body portion 20 to be raised. The first to the fourth connection pieces 211 to 214 are portions forming and the rigid coupling portion 2A with the side sill inner 152, and have a size large enough to perform spot welding. The flange portion 22 is a portion that is raised by similarly being bent rearward by substantially 90° with respect to the reinforcement main body portion 20 to be raised and continues from the second ridge portion 202. The flange portion 22 is a portion forming the flexible coupling portion 2B with the partitioning plate portion 135, and has a size large enough to hold the damping member 4 of a sufficient size. A step portion 221, extending in the front and rear direction, is formed on the flange portion 22 for improving the rigidity of the flange portion 22.

The reinforcement main body portion 20 is a portion functioning as a partitioning surface portion that partitions the first closed cross-sectional portion C1, defined by the partitioning plate portion 135 and the side sill inner 152, in the front and rear direction. Specifically, the reinforcement main body portion 20 forms a surface, extending in a direction substantially orthogonal to the direction in which the first closed cross-sectional portion C1 extends, in the first closed cross-sectional portion C1. Thus, the bulkheads 2 incorporated can improve the resistance against deformation force that crushes the first closed cross-sectional portion C1, that is, crushing deformation force of causing the side sill inner 152 and the partitioning plate portion 135 approach each other.

A raising process portion 23 is provided at the center of the reinforcement main body portion 20, and has a shape substantially similar to an outer shape of the reinforcement main body portion 20. The raising process portion 23 is a flat plate-shaped portion protruding rearward from a peripheral portion 203 in the reinforcement main body portion 20. In the raising process portion 23, a circular hole 24 and an elongated hole 25 that are two through holes perforated in the front and rear direction to be arranged side by side in the upper and lower direction.

The circular hole 24 and the elongated hole 25 are holes with various functions. The holes have: a first function to serve as holes through which a fluid flows in the front and rear direction at the disposed position of the bulkhead 2; a second function to serve as process reference holes when the bulkhead 2 is formed by performing the bending process on a metal plate; and a third function to serve as positioning holes for assembling the bulkhead 2 in the first closed cross-sectional portion C1. When the first function is exerted, the circular hole 24 and the elongated hole 25 are mainly used for passage holes with which an electrodeposition solution is entirely provided in the side sill 15, for performing electrodeposition coating on the vehicle-body 1 with an antirust agent. When the second or the third function is exerted, for example, the circular hole 24 is used as a fixing hole for the process or positioning, and the elongated hole 25 is used as a relief hole.

The first function will be described. As described above, the reinforcement main body portion 20 functions as the partitioning surface portion for partitioning the first closed cross-sectional portion C1. Thus, the reinforcement main body portion 20 closes the closed cross-sectional portion C1 of the side sill 15 extending in the front and rear direction. One of manufacturing steps for the vehicle-body 1 is a step of performing, after the vehicle-body 1 has been assembled, the electrodeposition coating on the vehicle-body 1 with the antirust agent, and the step involves dipping the vehicle-body 1 in the electrodeposition solution. When the reinforcement main body portion 20 is closing the first closed cross-sectional portion C1 in this process, the electrodeposition solution might fail to favorably spread over the inner surface of the side sill 15 (the inner surface of the side sill inner 152 and one surface of the partitioning plate portion 135). With the circular hole 24 and the elongated hole 25 formed, the electrodeposition solution can flow through the circular hole 24 and the elongated hole 25, to achieve favorable electrodeposition coating.

A raised ridge portion 26, formed by the raising process, is formed at a boundary between the peripheral portion 203 of the reinforcement main body portion 20 and the raising process portion 23. The raised ridge portion 26 includes a linear portion 27 extending, along the extending direction of the flange portion 22, at a portion between the flange portion 22 and the circular hole 24 and the elongated hole 25. The raised ridge portion 26 functions as a high rigidity portion for reinforcing the rigidity of the reinforcement main body portion 20 that is likely to be brittle, due to the circular hole 24 and the elongated hole 25 perforated. In particular, the linear portion 27 contributes to the improvement of the rigidity of the flange portion 22.

How the joining portion 21, forming the rigid coupling portion 2A, is joined to the side sill inner 152 is described by further referring to FIG. 2. The first connection piece 211 and the second connection piece 212 of the joining portion 21 are brought into contact with the inner surface of the second upper plate 1522 of the side sill inner 152, and are each fixed to the second upper plate 1522 by spot welding. The third connection piece 213 and the fourth connection piece 214 are brought into contact with and fixed by spot welding to the second side plate 1521 and the second lower plate 1523, respectively.

The flange portion 22 is a portion facing a surface of the partitioning plate portion 135 of the center pillar inner 132 on the vehicle inner side. The flange portion 22 according to the present embodiment has a rectangular shape elongated in the upper and lower direction in side view as illustrated in FIG. 11A, and has a shape slightly curved toward the vehicle inner side in upper view as illustrated in FIG. 11B. The step portion 221 linearly extends in the front and rear direction at a portion around the center of the first flange portion 22 in the upper and lower direction.

The flange portion 22 includes: a first surface 22X facing the partitioning plate portion 135; and a second surface 22Y on the opposite side thereof. The first surface 22X serves as a joining area, to be in contact with the damping member 4, in the flexible coupling portion 2B. Specifically, the first surface 22X faces the surface of the partitioning plate portion 135 on the vehicle inner side with a gap of a predetermined distance in between, and the damping member 4 is provided in the gap. In other words, the flange portion 22 and the partitioning plate portion 135 are joined to each other with the damping member 4 provided in between.

As described above, the rigid coupling portion 2A in the mode according to the present embodiment has the four connection pieces 211 to 214, as the joining portion 21, to be spot welded on the side sill inner 152. The number of the connection piece, that is, the number of spot welded portions are merely an example, and can be set as appropriate in accordance with the shape and the like of the side sill inner 152. The first ridge portion 201 may be welded onto the side sill inner 152, without no connection pieces formed for the rigid coupling portion.

The rigid coupling portion 2A can be formed with a method other than the spot welding, and a mechanical coupling portion using a bolt, a nut, or the like may be employed for example. In such a case, holes in which bolts are inserted are perforated in the first to the fourth connection pieces 211 to 214 and the side sill inner 152. Alternatively, the rigid coupling portion 2A may be a welded portion using an adhesive. In such a case, the adhesive may be an adhesive generally used in welding for the vehicle body. For example, an adhesive with storage modulus of 2000 MPa or more and a loss factor of 0.05 or less, under a condition with a temperature of 20° C. and an exciting force frequency of 30 Hz, may be favorably used.

The damping member 4 forming the flexible coupling portion 2B is a member having a vibration damping capability. The damping member 4 is not particularly limited as long as the member has a predetermined viscoelasticity, and may be a viscoelastic member made of a silicone material or an acrylic material. A viscoelastic member, with a property including storage modulus of 500 MPa or less or a loss factor of 0.2 or more under the condition with a temperature of 20° C. and an exciting force frequency of 30 Hz, is preferable because vibration transmission can be effectively suppressed. The damping member 4 formed of such a viscoelastic member damps vibration by absorbing vibrational energy as strain energy and converting the energy into thermal energy to be dissipated.

How the damping member 4 is arranged on the first surface 22X of the flange portion 22 is not particularly limited. For example, a layer of the damping member 4 may be formed by applying the viscoelastic member in a paste form on the flange portion 22 to be in a predetermined thickness. Alternatively, a bulk piece may be prepared as the damping member 4 and attached to the flange portion 22. The flange portion 22 may be divided into a plurality of pieces, as in the case of the joining portion 21, and in such a case, a layer serving as the damping member 4 is formed on each of the divided pieces of the flange portion 22.

As describe above, the vehicle-body 1 is coated with the antirust agent by electrodeposition. After this electrodeposition coating step, the vehicle-body 1 is introduced into a furnace, and a drying step of heating the vehicle-body 1 is performed at a predetermined temperature for a predetermined period, to dry the antirust agent layer. The heat in the drying step is preferably used for fixing the damping member 4. Specifically, the viscoelastic member in the paste form is applied on the flange portion 22 as described above before the electrodeposition coating step, and thus the bulkhead 2 supporting the application layer to serve as the damping member 4 in advance is rigidly coupled to the side sill inner 152 (spot welding). Then, the heat applied to the vehicle-body 1 in the drying step is preferably used to fix the application layer to the partitioning plate portion 135.

As described above, in the bulkhead 2, the reinforcement main body portion 20 is disposed to be the partition surface in the first closed cross-sectional portion C1, the joining portion 21 thereof form the rigid coupling portion 2A with the side sill inner 152, the flange portion 22 forms the flexible coupling portion 2B with the partitioning plate portion 135 of the center pillar inner 132 and the damping member 4. With this configuration, the first closed cross-sectional portion C1 has a higher deformation resistance and the side sill 15 has a higher rigidity. Furthermore, the stress generated by the vibrations of the vehicle is concentrated on the flexible coupling portion 2B that is deformable, and the damping member 4 damps the vibrations.

The bulkhead 2 has the raised ridge portion 26 on the reinforcement main body portion 20 and the step portion 221 on the flange portion 22 to have a higher rigidity. The raised ridge portion 26 improves the rigidity of the reinforcement main body portion 20 including the circular hole 24 and the elongated hole 25 that need to be perforated due to the various reasons. The step portion 221 improves the rigidity of the flange portion 22 having a strip shape elongated in the upper and lower direction. Thus, the bulkhead 2 has a higher rigidity to have an improved reinforcement capability for the first closed cross-sectional portion C1.

When the rigidity of the bulkhead 2 is improved, the difference between the bulkhead 2 and the damping member 4 in the rigidity increases, whereby the vibration generated on the vehicle-body 1 is even more concentrated on the damping member 4. For example, when the bulkhead 2 has a low rigidity under a condition that the reinforcement main body portion 20 is brittle due to the circular hole 24 and the elongated hole 25 perforated and thus is relatively easily bent, the vibrational stress due to the vibration applied to the bulkhead 2 is not completely transmitted to the damping member 4, and the vibrational stress is partially consumed for the bending deformation. Thus, the vibration damping effect of the damping member 4 is compromised. In view of this, in the present embodiment, the rigidity of the bulkhead 2 is increased around the damping member 4 with the raised ridge portion 26, that is, with the linear portion 27 and the step portion 221 in particular, whereby the vibrational stress can be transmitted to the damping member 4 with no losses. All things considered, the vibration damping effect of the damping member 4 can be further increased.

[Detail Description on Extended Portion]

Next, the extended portion 3 will be described. As illustrated in FIG. 3, FIG. 7, and FIG. 8, the extended portion 3, which is a portion integrally provided to the partitioning plate portion 135, is provided to the second closed cross-sectional portion C2 and includes the extended main body portion 31 and the extended joining portion 32. The extended portion 3 is a portion formed by performing the bending process on the extra length portion, extending from each of the front end edge 135F and the rear end edge 135B, additionally provided to the partitioning plate portion 135 of the center pillar inner 132 with an actually required length (the length between the front end edge 135F and the rear end edge 135B).

The extended main body portion 31 is a flat plate-shaped portion raised by being bent from the partitioning plate portion 135 extending in the front and rear direction, to extend toward the side sill outer reinforcer 151 from the front end edge 135F or the rear end edge 135B. The extended main body portion 31 is raised by being bent by approximately 90° with respect to the partitioning plate portion 135 of the extended main body portion 31. The extended joining portion 32 is a portion formed by bending an end edge portion of the extended main body portion 31 on the vehicle outer side by approximately 90°. The extended portion 3 on the front side has the extended joining portion 32 bent toward the front side, and the extended portion 3 on the rear side has the extended joining portion 32 bent toward the rear side.

The extended main body portion 31 is a portion that functions as the partitioning surface portion that partitions the second closed cross-sectional portion C2, including the partitioning plate portion 135 and the side sill outer reinforcer 151, in the front and rear direction. Thus, the extended main body portion 31 has a size corresponding to the cross section of the second closed cross-sectional portion C2. A hole 33 is perforated in the extended main body portion 31. The hole 33 is a hole perforated mainly for enabling the electrodeposition solution to flow in the second closed cross-sectional portion C2 in the electrodeposition coating process described above.

The extended joining portion 32 is a portion forming the rigid coupling portion 3A with the side sill outer reinforcer 151. The extended joining portion 32 is brought into contact with a bulging portion in the first side plate 1511 of the side sill outer reinforcer 151 bulging in the vehicle inner direction, and is fixed to the first side plate 1511 by spot welding. Another extended joining portion, forming the rigid coupling portion with the first upper plate 1512 and/or the first lower plate 1513 of the side sill outer reinforcer 151, may extend on the circumference edge of the extended main body portion 31. The extended main body portion 31 has a vehicle inner side end edge continuing from the front end edge 135F or the rear end edge 135B of the partitioning plate portion 135. Thus, a portion of the vehicle inner side end edge may also be regarded as a portion substantially forming the rigid coupling portion between the extended portion 3 and the partitioning plate portion 135.

As described above, the extended portion 3 has the extended main body portion 31 provided to serve as the partition surface for the second closed cross-sectional portion C2, and has the extended joining portion 32 forming the rigid coupling portion 3A with the side sill outer reinforcer 151. The extended portion 3 is a portion integrated with the partitioning plate portion 135, and can be regarded as substantially forming the rigid coupling portion with the partitioning plate portion 135. The extended portion 3 with the configuration described above can improve the deformation resistance of the second closed cross-sectional portion C2. Thus, the reinforcement for the second closed cross-sectional portion C2 by the extended portion 3 and the reinforcement for the first closed cross-sectional portion C1 by the bulkhead 2 are combined to increase the rigidity of the side sill 15 having a partitioned closed section structure obtained by the partitioning plate portion 135 extending in the front and rear direction.

The extended portion 3 extends toward the side sill outer reinforcer 151 and forms the rigid coupling portion 3A with the side sill outer reinforcer 151, in the vicinity (the front end edge 135F or the rear end edge 135B) of the flexible coupling portion 2B formed by the bulkhead 2. Thus, the stress generated by the vibration of the vehicle is concentrated on the flexible coupling portion 2B that is deformable, whereby the vibrations are effectively damped by the damping member 4.

The extended portion 3 includes: the extended main body portion 31 extending toward the side sill outer reinforcer 151 from the front end edge 135F or the rear end edge 135B; and the extended joining portion 32 at the end edge thereof. Thus, the extended portion 3 can be integrally formed with the partitioning plate portion 135 easily, through a simple bending process and the like on the partitioning plate portion 135.

[Description on Arrangement of Bulkhead and Extended Portion]

Next, an arrangement relationship between the bulkhead 2 and the extended portion 3 will be described. FIG. 12 is an enlarged view of the bulkhead 2 and the extended portion 3 on the front side in FIG. 3. The members are characteristically arranged in that, the flat plate-shaped reinforcement main body portion 20 of the bulkhead 2 and the flat plate-shaped extended main body portion 31 of the extended portion 3 are linearly arranged between the side sill outer reinforcer 151 and the side sill inner 152, as indicated by an arrow L1 in the FIG. 12.

Specifically, the bulkhead 2 and the extended portion 3 are arranged in such a manner that the second ridge portion 202 of the bulkhead 2 and the front end edge 135F face each other in the vehicle width direction with a space for arranging the damping member 4 provided in between. The flange portion 22 of the bulkhead 2 faces the partitioning plate portion 135 around the front end edge 135F. With such an arrangement of these members, the reinforcement main body portion 20 and the extended main body portion 31 are linearly arranged. The reinforcement main body portion 20 and the extended main body portion 31 may be slightly offset from each other in the front and rear direction. For example, a mode may be employed in which the second ridge portion 202 is disposed at a position slightly on the rear side of the front end edge 135F so that the flexible coupling portion 2B is formed slightly on the rear side of the front end edge 135F.

The side sill 15 can have a higher mechanical strength with the bulkhead 2 and the extended portion 3 arranged in such a manner that the reinforcement main body portion 20 and the extended main body portion 31 are linearly arranged. The side sill 15 has the partitioned closed section structure including the first and the second closed cross-sectional portions C1 and C2 arranged in the vehicle width direction while being partitioned with the partitioning plate portion 135 in the coupling portion J. The closed section structure includes the main body portions of the reinforcement main body portion 20 and the extended main body portion 31 linearly arranged, and thus when pressing force in the vehicle width direction acts on one of the main body portions, the pressing force can be directly transmitted to the other one of the main body portions. Thus, even higher mechanical strength with respect to the direction in which the side sill outer reinforcer 151 and the side sill inner 152 approach each other, that is, the deformation resistance against the side crash of the vehicle-body 1, can be achieved. The term linear indicates an arrangement the two members (the reinforcement main body portion 20 and the extended main body portion 31) along a straight line or a substantially linear line, and is not limited to an arrangement of the two members along the perfect straight line.

In the present embodiment, the reinforcement main body portion 20 and the extended main body portion 31 each extend to be orthogonal to the partitioning plate portion 135. Specifically, the linear member including the reinforcement main body portion 20 and the extended main body portion 31, as indicated by the arrow L1, crosses the partitioning plate portion 135 with a crossing angle of approximately 90°. Thus, an even higher mechanical strength can be achieved in the direction in which the side sill outer reinforcer 151 and the side sill inner 152 approach each other. For example, the side sill 15 illustrated in FIG. 2 has a cross-sectional shape (partitioned closed section structure) with two substantially rectangular shapes arranged. The reinforcement main body portion 20 and the extended main body portion 31 achieve an even higher effect of preventing the cross section from deforming to be in a diamond shape due to force in the vehicle width direction acting on the side sill 15. The term orthogonal described above indicates an arrangement in which the partitioning plate portion 135 and the linear member including the reinforcement main body portion 20 and the extended main body portion 31 cross each other with a crossing angle of about 80 to 100°, and is not limited to the arrangement of the members crossing each other with the crossing angle of 90°.

As a result of the above, the damping member 4 is disposed at a position to be able to exert the vibration damping effect sufficiently. Specifically, the partitioning plate portion 135 has the end portions (the front end edge 135F and the rear end edge 135B) in the closed cross-sectional portion of the side sill 15, and thus the end portions are portions that are likely to deform by the vibrations. The flange portion 22 is joined to the vicinity of such an end portion of the partitioning plate portion 135 so that the damping member 4 can receive relatively large distortion stress, whereby a higher vibration damping effect can be achieved.

Furthermore, the portion where the linear member, including the reinforcement main body portion 20 and the extended main body portion 31, and the partitioning plate portion 135 cross each other is designed to increase the difference in the rigidity from the damping member 4. The bulkhead 2 has the flange portion 22 formed by bending the end edge portion of the reinforcement main body portion 20. The raised ridge portion 26 (high rigidity portion), for reinforcing the rigidity of the reinforcement main body portion 20, is a step portion obtained with the reinforcement main body portion 20 deformed to protrude orthogonally from a plane of the reinforcement main body portion 20. The flange portion 22 is bent in a direction toward the rear (front in the case of the bulkhead 2 on the rear side), and the raised ridge portion 26 protrudes also in the direction toward the rear (front in the case of the bulkhead 2 on the rear side). Thus, the members are orientated in the same direction.

Thus, an area with a gate-shaped cross-sectional shape, as indicated by a dotted line form denoted with a reference numeral L2 in FIG. 12, is formed by the flange portion 22 and the linear portion 27 as a part of the raised ridge portion 26 as well as the reinforcement main body portion 20 therebetween. Thus, an even higher rigidity is achieved in an area adjacent to the damping member 4, whereby a large difference between the damping member 4 and the bulkhead 2 in the rigidity is achieved. All things considered, the distortion stress generated by the vibrations of the vehicle can be concentrated on the damping member 4, whereby an even higher vibration damping effect can be achieved with the damping member 4.

[Description on Modification]

The present invention is not limited to the embodiment described above, and the following modification of the present invention can be employed.

(1) FIG. 13 is a cross-sectional view of a coupling portion between the side sill 15 and the center pillar 13 according to a modification, in the vehicle width direction. In the example described in the embodiment, the bulkhead 2 is disposed between the side sill inner 152 and the partitioning plate portion 135, and the extended portion 3 extends toward the side sill outer reinforcer 151. In an example of the modification illustrated in FIG. 13, the extended portion 3 extends toward the side sill inner 152.

The bulkhead 2 is disposed between the side sill outer reinforcer 151 and the partitioning plate portion 135, and the joining portion 21 thereof forms the rigid coupling portion 3A with the side sill outer reinforcer 151. The modification is the same as the embodiment described above in that the flange portion 22 forms the flexible coupling portion 2B with the partitioning plate portion 135. The extended portion 3 has the extended main body portion 31 extending from the front end edge 135F to the side sill inner 152, and has the extended joining portion 32 forming the rigid coupling portion 3A with the side sill inner 152. In the modification, the side sill outer reinforcer 151 and the side sill inner 152 respectively correspond to a first panel and a second panel in the claims. This modification can provide the advantageous effect that is the same as that in the embodiment.

(2) In the example described in the embodiment, the extended portion 3 has the extended joining portion 32 forming the rigid coupling portion 3A with the side sill outer reinforcer 151. Alternatively, the extended joining portion 32 may form the flexible coupling portion. In such a case, the damping member 4 is provided between the extended joining portion 32 and the side sill outer reinforcer 151. In this modification, the damping member 4 is disposed not only between the flange portion 22 of the bulkhead 2 and the partitioning plate portion 135 but is also provided between the extended joining portion 32 and the side sill outer reinforcer 151, whereby a higher vibration damping effect can be achieved.

(3) In the example described in the embodiment, the body structure according to the present invention is applied to the coupling portion J between the side sill 15 and the center pillar 13. This is merely an example, and the present invention may be applied to a coupling portion between the side sill 15 and the front pillar 12, for example. Furthermore, the present invention can be widely applied to a portion having a partitioned closed section structure including: two panels (frames) forming a closed section and extending in the predetermined direction; and a partitioning panel disposed in the closed section and extending in the predetermined direction.

In a final section described below, the characteristic configurations disclosed in the embodiment, and advantageous effects based on the configurations are summarized.

A body structure of a vehicle according to the embodiment includes a first panel and a second panel that form a closed cross-sectional portion extending in a predetermined direction, a partitioning panel that partitions the closed cross-sectional portion and extends in the predetermined direction, and a reinforcement member that is disposed between the first panel and the partitioning panel in the closed cross-sectional portion, and includes a panel joining portion joined to the first panel, and a flange portion joined to the partitioning panel. A joining portion formed by the reinforcement member includes a rigid coupling portion in which the first panel and the panel joining portion are coupled to each other while being in contact with each other, and a flexible coupling portion in which the partitioning panel and the flange portion are coupled to each other, with a damping member being provided therebetween. The partitioning panel includes an extended portion that extends from a vicinity of the flexible coupling portion toward the second panel and is joined to the second panel.

In this body structure, the reinforcement member is provided between the first panel and the partitioning panel, and the extended portion, extending from the partitioning panel, is provided between the partitioning panel and the second panel. Thus, the deformation resistance of the closed cross-sectional portion can be improved by the reinforcement member and the extended portion. The reinforcement member forms the rigid coupling portion with the first panel, and forms the soft coupling portion with the partitioning panel. Thus, the damping member disposed in the flexible coupling portion can effectively damp the vibration of the vehicle body.

In the body structure, preferably, a joining portion formed by the extended portion together with the second panel is a rigid coupling portion in which a part of the extended portion and the second panel are coupled to each other while being in contact with each other.

The extended portion is a portion extending from the partitioning panel, and substantially forms the rigid coupling portion with the partitioning panel. In the body structure, a part of the extended portion forms the rigid coupling portion with the second panel. Thus, the stress generated by vibration of the vehicle is concentrated on the flexible coupling portion that is deformable, whereby the vibration is effectively damped by the damping member.

In the body structure, preferably, the partitioning panel has an end portion in the predetermined direction, the flange portion is joined to the partitioning panel near the end portion, and the extended portion includes an extended main body portion extending from the end portion toward the second panel, and an extended joining portion that is formed at an end edge of the extended main body portion and is joined to the second panel.

When the partitioning panel has an end portion in the closed cross-sectional portion, the end portion is a portion where deformation based on the vibration is likely to occur. In the body structure, the flange portion is joined to the vicinity of such an end portion of the partitioning panel, and thus the damping member can receive relatively large distortion stress, whereby a higher vibration damping effect can be obtained. The extended portion includes: the extended main body portion extending from the end portion toward the second panel; and the extended joining portion at the end edge thereof. Thus, there is an advantage that the extended portion can be integrally formed with the partitioning plate portion easily, through a simple bending process and the like on the partitioning plate portion.

In the body structure, preferably, the extended main body portion has a flat-plate shape, the reinforcement member includes a reinforcement main body portion having a flat-plate shape that extends between the panel joining portion and the flange portion, and the reinforcement member and the extended portion are arranged in such a manner that the extended main body portion and the reinforcement main body portion are linearly arranged between the first panel and the second panel.

In the body structure, the extended main body portion and the reinforcement main body portion are linearly arranged, whereby a higher mechanical strength in the direction in which the first panel and the second panel of the closed cross-sectional portion approach each other can be achieved. Thus, even higher deformation resistance of the closed cross-sectional portion can be achieved while providing the vibration damping effect.

In this case, the mechanical strength can further be increased with the extended main body portion and the reinforcement main body portion extending orthogonal to the partitioning panel.

In the body structure, preferably, the first panel is a side sill inner, the second panel is a side sill outer reinforcer, and the partitioning panel is a center pillar inner, and the extended portion is joined to the side sill outer reinforcer.

As described above, the coupling portion between the center pillar and the side sill is likely to be largely deformed by the vibration of the vehicle, and involves a higher requirement for a resistance against external force. Thus, the body structure according to the present invention is suitably applied.

According to the present invention described above, a body structure of vehicle can be provided with which a closed cross-sectional portion can be prevented from deforming and a damping member can effectively provide a vibration damping function, in a vehicle-body portion with a partitioned closed section structure. Thus, the closed cross-sectional portion can have a higher strength and a riding comfort of a vehicle can be improved.

The invention claimed is:

1. A body structure of a vehicle, the structure comprising:
 a first panel and a second panel that form a closed cross-sectional portion extending in a predetermined direction;
 a partitioning panel that partitions the closed cross-sectional portion and extends in the predetermined direction; and
 a reinforcement member that is disposed between the first panel and the partitioning panel in the closed cross-sectional portion, and includes a panel joining portion joined to the first panel and a flange portion joined to the partitioning panel, wherein
 a joining portion formed by the reinforcement member includes:
 a rigid coupling portion in which the first panel and the panel joining portion are coupled to each other while being in contact with each other; and
 a flexible coupling portion in which the partitioning panel and the flange portion are coupled to each other, with a damping member being provided therebetween, and
 the partitioning panel includes an extended portion that extends from a vicinity of the flexible coupling portion toward the second panel and is joined to the second panel.

2. The body structure of a vehicle according to claim 1, wherein a joining portion formed by the extended portion together with the second panel is a rigid coupling portion in which a part of the extended portion and the second panel are coupled to each other while being in contact with each other.

3. The body structure of a vehicle according to claim 1, wherein
 the partitioning panel has an end portion in the predetermined direction,
 the flange portion is joined to the partitioning panel near the end portion, and
 the extended portion includes:
 an extended main body portion extending from the end portion toward the second panel; and
 an extended joining portion that is formed at an end edge of the extended main body portion and is joined to the second panel.

4. The body structure of a vehicle according to claim 3, wherein
 the extended main body portion has a flat-plate shape,
 the reinforcement member includes a reinforcement main body portion having a flat-plate shape that extends between the panel joining portion and the flange portion, and
 the reinforcement member and the extended portion are arranged in such a manner that the extended main body portion and the reinforcement main body portion are linearly arranged between the first panel and the second panel.

5. The body structure of a vehicle according to claim 4, wherein the extended main body portion and the reinforcement main body portion extend orthogonal to the partitioning panel.

6. The body structure of a vehicle according to claim 1, wherein
 the first panel is a side sill inner, the second panel is a side sill outer reinforcer, and the partitioning panel is a center pillar inner, and
 the extended portion is joined to the side sill outer reinforcer.

7. The body structure of a vehicle according to claim 2, wherein
 the partitioning panel has an end portion in the predetermined direction,
 the flange portion is joined to the partitioning panel near the end portion, and
 the extended portion includes:
 an extended main body portion extending from the end portion toward the second panel; and
 an extended joining portion that is formed at an end edge of the extended main body portion and is joined to the second panel.

8. The body structure of a vehicle according to claim 7, wherein
 the extended main body portion has a flat-plate shape,
 the reinforcement member includes a reinforcement main body portion having a flat-plate shape that extends between the panel joining portion and the flange portion, and
 the reinforcement member and the extended portion are arranged in such a manner that the extended main body portion and the reinforcement main body portion are linearly arranged between the first panel and the second panel.

9. The body structure of a vehicle according to claim 8, wherein the extended main body portion and the reinforcement main body portion extend orthogonal to the partitioning panel.

10. The body structure of a vehicle according to claim 2, wherein
 the first panel is a side sill inner, the second panel is a side sill outer reinforcer, and the partitioning panel is a center pillar inner, and
 the extended portion is joined to the side sill outer reinforcer.

11. The body structure of a vehicle according to claim 3, wherein
 the first panel is a side sill inner, the second panel is a side sill outer reinforcer, and the partitioning panel is a center pillar inner, and the extended portion is joined to the side sill outer reinforcer.

12. The body structure of a vehicle according to claim 7, wherein the first panel is a side sill inner, the second panel is a side sill outer reinforcer, and the partitioning panel is a center pillar inner, and the extended portion is joined to the side sill outer reinforcer.

13. The body structure of a vehicle according to claim 4, wherein the first panel is a side sill inner, the second panel is a side sill outer reinforcer, and the partitioning panel is a center pillar inner, and the extended portion is joined to the side sill outer reinforcer.

14. The body structure of a vehicle according to claim 8, wherein the first panel is a side sill inner, the second panel is a side sill outer reinforcer, and the partitioning panel is a center pillar inner, and the extended portion is joined to the side sill outer reinforcer.

15. The body structure of a vehicle according to claim 5, wherein the first panel is a side sill inner, the second panel is a side sill outer reinforcer, and the partitioning panel is a center pillar inner, and the extended portion is joined to the side sill outer reinforcer.

16. The body structure of a vehicle according to claim 9, wherein the first panel is a side sill inner, the second panel is a side sill outer reinforcer, and the partitioning panel is a center pillar inner, and the extended portion is joined to the side sill outer reinforcer.

* * * * *